US011911331B2

(12) United States Patent
Aoki et al.

(10) Patent No.: US 11,911,331 B2
(45) Date of Patent: Feb. 27, 2024

(54) LEG BRACE AND GARMENT COVERING LEG BRACE

(71) Applicant: TOYOTA JIDOSHA KABUSHIKI KAISHA, Toyota (JP)

(72) Inventors: Eisuke Aoki, Toyota (JP); Tomio Ikeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 297 days.

(21) Appl. No.: 17/069,311

(22) Filed: Oct. 13, 2020

(65) Prior Publication Data

US 2021/0161746 A1 Jun. 3, 2021

(30) Foreign Application Priority Data

Nov. 28, 2019 (JP) ................................ 2019-215431

(51) Int. Cl.
*A61H 3/00* (2006.01)
*A61H 1/02* (2006.01)

(52) U.S. Cl.
CPC ............ *A61H 1/0237* (2013.01); *A61H 3/00* (2013.01); *A61H 2201/165* (2013.01); *A61H 2201/1642* (2013.01)

(58) Field of Classification Search
CPC ................... A61H 1/0237; A61H 3/00; A61H 2201/01642; A61H 2201/165
See application file for complete search history.

(56) References Cited

U.S. PATENT DOCUMENTS

| | | | | |
|---|---|---|---|---|
| 4,237,708 A * | 12/1980 | Bremer, Jr. | E05B 75/00 | 128/882 |
| 9,375,377 B1 * | 6/2016 | Edwards | A61F 5/0123 | |
| 10,583,063 B2 * | 3/2020 | Fagan | A61H 1/024 | |
| 11,135,124 B2 * | 10/2021 | Threlfall | A61H 3/04 | |
| 2005/0278038 A1 | 12/2005 | Ikeda | | |
| 2010/0174219 A1 * | 7/2010 | Franke | A61F 5/0125 | 602/26 |
| 2012/0016277 A1 | 1/2012 | Ebihara et al. | | |
| 2015/0164673 A1 * | 6/2015 | Rhodes | A61F 5/0127 | 602/28 |
| 2017/0361150 A1 * | 12/2017 | Polinsky | A63B 21/08 | |

(Continued)

FOREIGN PATENT DOCUMENTS

| | | |
|---|---|---|
| CN | 1720880 A | 1/2006 |
| CN | 102470071 A | 5/2012 |
| CN | 204812220 U | 12/2015 |

(Continued)

*Primary Examiner* — Jerrah Edwards
*Assistant Examiner* — Aren Patel
(74) *Attorney, Agent, or Firm* — Oliff PLC

(57) ABSTRACT

A leg brace configured to be attached to a leg of a user, includes a rear thigh link extending along a thigh of the user, and a lower-leg link rotatably connected to the rear thigh link and extending along a lower leg of the user. A handle is provided in the thigh link, the handle being configured to project forward when the user is in the sitting position. The rear thigh link and the lower-leg link are connected to each other near the knee joint of the user. Specifically, the rear thigh link and the lower-leg link are connected to each other at a rear connection part disposed near the knee joint. Further, the rear thigh link and the handle are also connected to each other near the knee joint.

11 Claims, 5 Drawing Sheets

(56) References Cited

U.S. PATENT DOCUMENTS

2019/0142679 A1* 5/2019 Kramer .............. A63B 23/0494
601/34

FOREIGN PATENT DOCUMENTS

| | | | |
|---|---|---|---|
| CN | 107322575 | A | 11/2017 |
| CN | 207206407 | U | 4/2018 |
| CN | 209378003 | U | 9/2019 |
| JP | H08187137 | A | 7/1996 |
| JP | 2006-204485 | A | 8/2006 |
| JP | 2018-518318 | A | 7/2018 |
| WO | 2016/210121 | A1 | 12/2016 |

* cited by examiner

LEG BRACE AND GARMENT COVERING LEG BRACE

CROSS REFERENCE TO RELATED APPLICATIONS

This application is based upon and claims the benefit of priority from Japanese patent application No. 2019-215431, filed on Nov. 28, 2019, the disclosure of which is incorporated herein in its entirety by reference.

BACKGROUND

The present disclosure relates to a leg brace and a garment covering the leg brace.

Published Japanese Translation of PCT International Publication for Patent Application, No. 2018-518318 (hereinafter referred to as Patent Literature 1) discloses an artificial knee including a thigh link fixed to a thigh of a user, a shin link fixed to a shin thereof, and a passive compressive force generator that resists bending of the shin link with respect to the thigh link. The passive compressive force generator is, for example, an air spring or a compression coil spring.

SUMMARY

Patent Literature 1 does not disclose any technical matter about the reduction of a physical burden on a user that is caused when the user stands up from a sitting position.

One of the objects of the present disclosure is to provide a technique for reducing a physical burden on a user that is caused when the user stands up from a sitting position.

A first exemplary aspect is a leg brace configured to be attached to a leg of a user, including: a thigh link extending along a thigh of the user; and a lower-leg link rotatably connected to the thigh link and extending along a lower leg of the user, in which a handle is provided in the thigh link, the handle being configured to project forward when the user is in the sitting position. According to the above-described configuration, when a user stands up from a sitting position, the user grasps the handle and applies the load (i.e., the weight) of his/her upper body to the handle, so that a moment which assists the user's standing-up motion is generated in the thigh link. As a result, the physical burden of the user that is caused when the user stands up is reduced.

The thigh link and the lower-leg link are connected to each other near the knee joint of the user, and the thigh link and the handle are also connected to each other near the knee joint. According to the above-described configuration, it is possible to prevent the load applied to the handle from counteracting the moment which assists the user's standing-up motion.

The handle is disposed in the thigh link in a cantilevered manner. According to the above-described configuration, a handle having a simple structure can be realized.

The leg brace further includes two thigh links arranged so as to sandwich a thigh of the user therebetween in the left/right direction of the user, and the handle is disposed so as to connect the two thigh links to each other. According to the above-described configuration, the two thigh links can be connected to each other by the handle.

The handle is detachably disposed in the thigh link. According to the above-described configuration, when the handle is not used, the handle can be detached from the thigh link.

An attaching/detaching part configured to attach/detach the handle to/from the thigh link is formed in the thigh link.

According to the above-described configuration, the handle can be attached to and detached from the thigh link.

The handle can extend and contract in a longitudinal direction. According to the above-described configuration, when the handle is not used, the handle can be contracted in the longitudinal direction.

The handle is configured to be switchable between a first posture in which the handle projects forward when the user is in the sitting position and a second posture in which the handle extends along the thigh link when the user is in the sitting position. According to the above-described configuration, when the handle is not used, the handle can be brought into the second posture.

Another aspect is a garment with an opening formed therein, the garment being configured to be put on a leg of a user, to which the above-described leg brace is attached, so as to cover the leg brace, the opening conforming to the attaching/detaching part. According to the above-described configuration, the handle can be attached to and detached from the thigh link while the user is wearing the garment.

The garment includes an opening cover configured to cover the opening. According to the above structure, since the opening can be covered by the opining cover when the handle is not used, the design of the garment is improved.

According to the present disclosure, it is possible to reduce a physical burden of a user that is caused when the user stands up from a sitting position.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

A first embodiment will be described hereinafter with reference to FIGS. 1 and 2.

Figure 1:
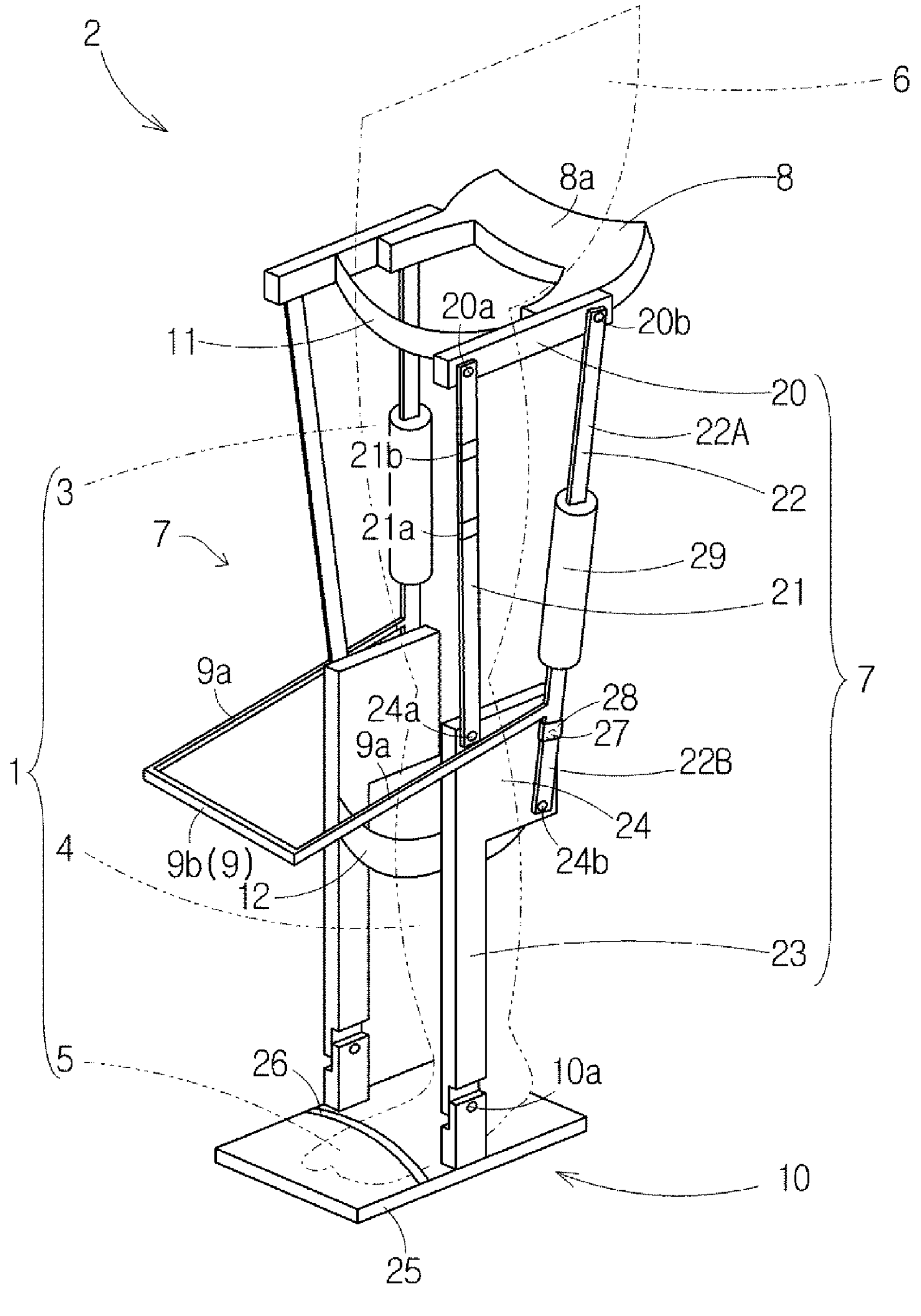
FIG. 1 is a perspective view of a leg brace (first embodiment)
Figure 2:
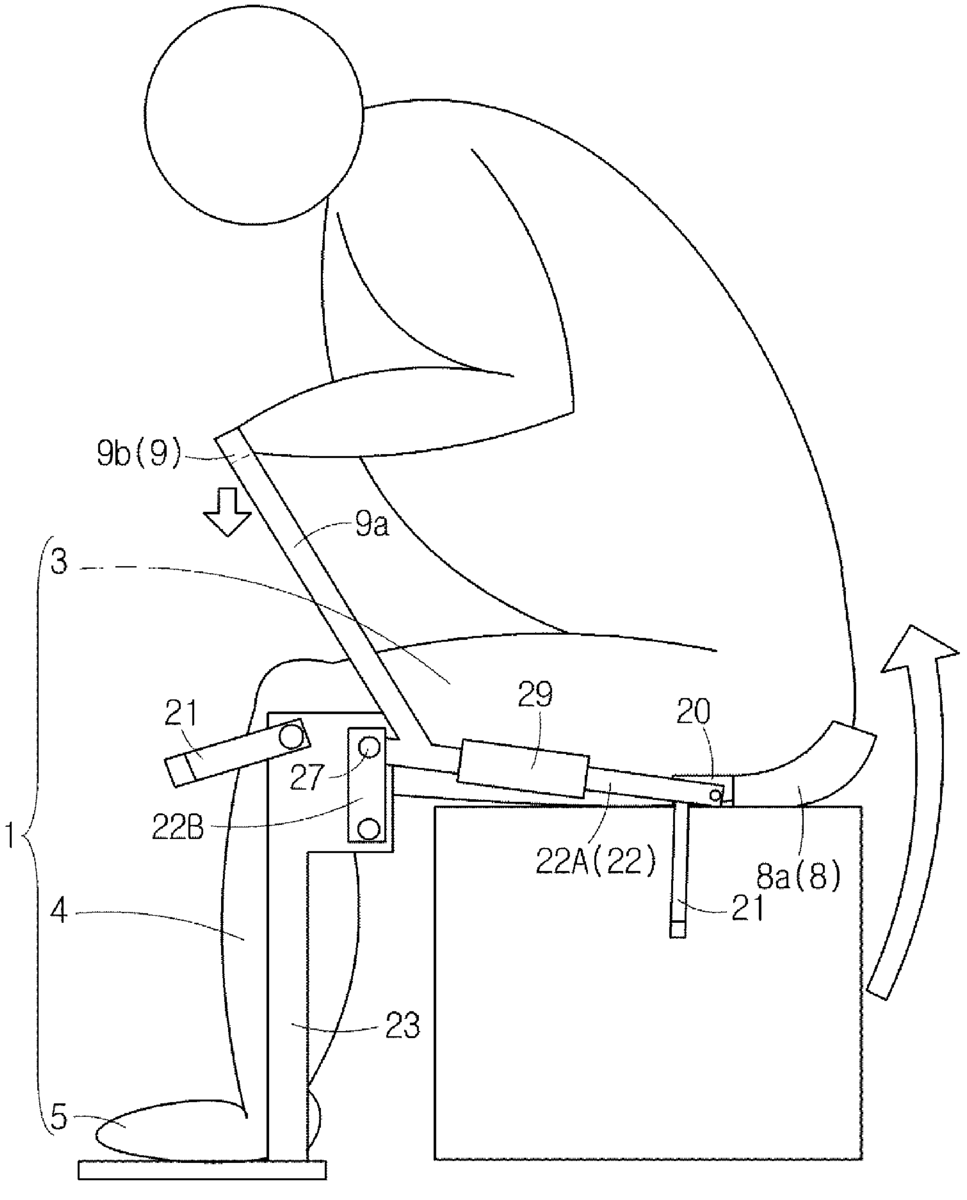
FIG. 2 is a diagram for explaining a mechanism of a motion of the leg brace that is performed when a user stands up from a sitting position (first embodiment)

FIG. 1 shows a leg brace 2 which is attached to a leg 1 of a user when it is used.

The leg 1 is composed of a thigh 3, a lower leg 4, and a foot 5. A buttock 6 is positioned above the leg 1.

The leg brace 2 includes two link structures 7, a buttock support part 8, a handle 9, a foot attaching part 10, a thigh fixing band 11, and a lower-leg fixing band 12.

The two link structures 7 are arranged so as to be opposed to (i.e., face) the right side and the left side, respectively, of the leg 1. That is, the two link structures 7 are arranged so as to sandwich the leg 1 therebetween in the left/right direction of the user. Hereinafter, the left/right direction of the user is simply referred to as the left/right direction. The left/right direction can also be considered to be the width direction of the user.

Each of the link structures 7 is composed of a buttock link 20, a front thigh link 21, a rear thigh link 22, and a lower-leg link 23.

The buttock link 20 is a link that is disposed at the base of the thigh 3 and extends roughly horizontally when the user is in the standing position.

The front and rear thigh links 21 and 22 extend along the longitudinal direction of the thigh 3. The front and rear thigh links 21 and 22 extend roughly vertically when the user is in the standing position. The front thigh link 21 is disposed forward of the rear thigh link 22.

The lower-leg link 23 extends in the longitudinal direction of the lower leg 4. A thigh link connection part 24 is formed at the upper end of the lower-leg link 23.

Further, the upper end of the front thigh link 21 is rotatably connected to a front connection part 20*a* of the buttock link 20. The upper end of the rear thigh link 22 is rotatably connected to a rear connection part 20*b* of the buttock link 20. The front connection part 20*a* is positioned forward of the rear connection part 20*b*.

The lower end of the front thigh link 21 is rotatably connected to a front connection part 24*a* of the thigh link connection part 24. The lower end of the rear thigh link 22 is rotatably connected to a rear connection part 24*b* of the thigh link connection part 24. The front and rear connection parts 24*a* and 24*b* are disposed away from each other (i.e., arranged with a space therebetween) in the front/rear direction and in the vertical direction. The front connection part 24*a* is positioned forward of and above the rear connection part 24*b*.

Therefore, the buttock link 20, the front thigh link 21, the rear thigh link 22, and the thigh link connection 24 constitute the so-called four-bar linkage.

The lower end of the lower-leg link 23 is rotatably connected to a leg connection part 10*a* of the leg attaching part 10.

The foot attaching part 10 is fixed to the foot 5. In FIG. 1, the foot attaching part 10 is a sandal, and is composed of a sole part 25 that is opposed to the sole of the foot 5 of the leg 1 and a foot fixing band 26 that is opposed to the instep of the foot 5 of the leg 1. Further, the foot attaching part 10 is fixed to the foot 5 in such a manner that the foot 5 is sandwiched between the sole part 25 and the foot fixing band 26. Alternatively, the foot attaching part 10 may be a boot, a sneaker, a leather shoe, or a slip on.

In this embodiment, the front thigh link 21 is a string made of a flexible material, typically made of a polyamide synthetic resin such as nylon. The front thigh link 21 includes a length adjusting mechanism 21*a* and a detaching mechanism 21*b*. The length adjusting mechanism 21*a* is a mechanism for adjusting the length of the front thigh link 21 in the longitudinal direction, i.e., the distance between the front connection part 20*a* and the front connection part 24*a*, and is typically formed by a belt feed. The detaching mechanism 21*b* is a mechanism for temporarily detaching the front thigh link 21, and is typically a buckle.

In this embodiment, the front thigh link 21 is made of a flexible material.

However, the front thigh link 21 may be made of a non-flexible material. For example, the front thigh link 21 is formed of a beam made of metal or wood. Further, specific examples of the flexible material are not limited to the above-shown synthetic resins and may include metals. In such cases, the front thigh link 21 may be a metal wire.

The rear thigh link 22 is composed of a rear thigh link upper part 22A and a rear thigh link lower part 22B. The rear thigh link upper part 22A and the rear thigh link lower part 22B are rotatably connected to each other at a rear thigh connection part 27. The rear thigh connection part 27 is provided with a switching snap 28 for switching between a state in which the rear thigh link upper part 22A is relatively rotatable with respect to the rear thigh link lower part 22B and a state in which the rear thigh link upper part 22A is not rotatable with respect to the rear thigh link lower part 22B. The switching snap 28 is typically a tubular member provided in the rear thigh link lower part 22B in such a manner that the tubular member is slidable along the rear thigh link lower part 22B in its longitudinal direction. In this case, when the switching snap 28 is slid upward and thereby covers the rear thigh link upper part 22A, the rear thigh link upper part 22A becomes the aforementioned non-rotatable state. Further, when the switching snap 28 is slid downward and hence is moved away from the rear thigh link upper part 22A, the rear thigh link upper part 22A becomes the aforementioned rotatable state. The configuration of the switching snap 28 is not limited to the above-described configuration. That is, other known configurations may be adopted for the switching snap 28.

A gas spring 29 is provided in the rear thigh link upper part 22A. The gas spring 29 is a spring using a reaction force of a compressed gas, and obtains the reaction force by filling a sealed cylinder with a nitrogen gas, which is used as the compressed gas, and compressing the gas by a piston. The rear thigh link upper part 22A can be extended and contracted in the longitudinal direction thereof by the gas spring 29.

The buttock support part 8 is a part that supports a buttock 6 of a user. The buttock support part 8 includes a buttock facing part 8*a* that is substantially opposed to (i.e., faces) the hipbone of the user when the user is in the standing position or in the sitting position. The buttock support part 8 is supported as a double fixed beam by the buttock links 20 of the two link structures 7. That is, the buttock support 8 connects the buttock links 20 of the two link structures 7 to each other. The buttock facing part 8*a* is disposed rearward of the rear connection part 20*b* when the user is in the standing position. The buttock facing part 8 may has an open-cell structure such as urethane foam, or a closed-cell structure such as polyethylene foam in order to disperse a contact pressure exerted to the user buttock facing part 8.

The thigh fixing band 11 is provided for fixing the buttock links 20 of the two link structures 7 and the buttock support part 8 to the base of the thigh 3. Therefore, it can be expressed that the front and rear thigh links 21 and 22 are fixed to the thigh 3.

The lower-leg fixing band 12 is provided for fixing the lower-leg links 23 of the two link structures 7 to the lower leg 4.

The handle 9 is provided in order to reduce the physical burden of the user that is caused when the user stands up from the sitting position, and is disposed near his/her knee. Specifically, the handle 9 connects the rear thigh link upper parts 22A of the rear thigh links 22 of the two link structures 7 to each other. Further, the handle 9 is supported as a double fixed beam by the two rear thigh link upper parts 22A and is formed in a U-shape with its opened side facing rearward.

That is, the handle 9 includes two forward projecting parts 9*a* and a grasping part 9*b*. The handle 9 includes at least one forward projecting part 9*a*.

Each of the front projecting parts 9*a* projects forward from the rear thigh upper part 22A of the rear thigh link 22 of a respective one of the link structures 7. As shown in FIG. 2, when the user is in the sitting position, each of the front projecting parts 9*a* projects forward from a respective one of the rear thigh link upper parts 22A. Specifically, when the user is in the sitting position, each of the front projecting parts 9*a* projects forward and upward in an oblique direction from a respective one of the rear thigh link upper parts 22A. The grasping part 9*b* is a part that connects the tips of the two front projecting parts 9*a* to each other, and extends in the left/right direction. Further, the grasping part 9*b* has such a thickness that the user can easily grasp it. Note that the forward is a direction in which the front of the user's body faces.

The above-described leg brace 2 is particularly suitable for knee osteoarthritis.

The knee osteoarthritis causes a symptom in which cartilage in a knee joint deteriorates or is worn away, causing a pain in the knee during walking.

In the early stage of knee osteoarthritis, walking on level ground does not cause a problem, but the patient may feel a pain in his/her knee when he/she goes up and down stairs. Alternatively, the patient does not feel a pain in his/her knee during walking, but he/she cannot sit down in the Japanese "seiza" style (i.e., cannot sit on his/her heels) because of a pain in his/her knee.

As the knee osteoarthritis progresses, both legs become O-shaped bowlegs or X-shaped bowlegs. As a result, the burden on the joint increases due to the wear of the cartilage and hence the knee joint becomes arthritic. Further, because of the arthritis, mere bending and stretching of the knee become painful. Therefore, the patient has a difficulty in not only going up and down stairs, but also walking on level ground.

Further, as the knee osteoarthritis progresses even further, the cartilage disappears (i.e., is completely worn out) and the thighbone and the shinbone directly rub against each other, thus causing a severe pain.

For a patient with knee osteoarthritis, the most direct cause of a pain in the knee joint is that the knee joint supports the trunk, the head, and the arms of the patient. Therefore, if a part or the whole of the load (e.g., the weight) exerted on the knee joint can be relieved, the pain in the knee joint can be alleviated.

Therefore, the leg brace 2 functions as a knee joint weight-bearing apparatus for relieving a part or the whole of the load exerted on the knee joint.

Specifically, once the leg brace 2 is attached to the leg 1, the user feels, when he/she walks, as if he/she is walking while sitting on a chair at all times. Note that the buttock support part 8 of the leg brace 2 functions as a sitting surface of the chair, and both of the link structures 7 function as legs of the chair.

Specific operations of the leg brace 2 are described hereinafter.

That is, when a user applies a load (e.g., his/her weight) to the buttock support 8, the load is received by the rear thigh links 22 of both the link structures 7 and the lower-leg links 23. In this state, a compressive force acts on each of the rear thigh links 22 in the longitudinal direction thereof. Meanwhile, an expansive force acts on each of the front thigh link 21 in the longitudinal direction thereof. That is, the front connection part 20*a* acts as a fulcrum, the buttock facing part 8*a* becomes a point of force. Further, the rear connection part 20*b* becomes a point of action.

When the user bends the knee joint of the leg 1, the gas spring 29 moderately contracts in the longitudinal direction thereof, so that the posture of the buttock support 8 does not lean forward and hence it can continuously and stably support the buttock 6.

When the user is in the sitting position, firstly, he/she separates the front thigh link 21 into two sections by using a detaching mechanism 21*b* thereof. Next, the user brings the rear thigh link upper part 22A into a state in which it is rotatable about the rear thigh connection part 27, i.e., rotatable with respect to the rear thigh link lower part 22B by using the switching snap 28. In this way, the user can change his/her position to the sitting position as shown in FIG. 2 without being hampered by the link structure 7.

When the user stands up from the sitting position, the user grasps the grasping part 9*b* of the handle 9 and applies the load (i.e., the weight) of his/her head and upper body to the grasping part 9*b*. As a result, a moment for pushing the buttock support part 8 upward is generated in the rear thigh link upper part 22A which is fixed to the base of the thigh 3. That is, a moment that assists the user's standing-up motion is generated in the rear thigh link upper part 22A. The standing-up motion includes, for example, a motion of lifting the buttock 6 upward. Therefore, it is possible to reduce the physical burden of the user that is caused when the user stands up from the sitting position.

The first embodiment has been described above, and the above-described first embodiment includes the below-described features.

That is, as shown in FIG. 1, the leg brace 2 attached to a leg 1 of a user includes a rear thigh link 22 (a thigh link) extending along a thigh 3 of the user, and a lower-leg link 23 rotatably connected to the rear thigh link 22 and extending along a lower leg 4 of the user. The rear thigh link 22 is provided with a handle 9 that projects forward when the user is in the sitting position. According to the above-described configuration, when the user stands up from the sitting position, the user grasps the handle 9 and applies the load (i.e., the weight) of his/her upper body to the handle 9, so that a moment which assists the user's standing-up motion is generated in the rear thigh link 22. As a result, the physical burden of the user that is caused when the user stands up is reduced.

Further, the rear thigh link 22 and the lower-leg link 23 are connected to each other near the knee joint of the user. Specifically, the rear thigh link 22 and the lower-leg link 23 are connected to each other at a rear connection part 24*b* disposed near the knee joint. Further, the rear thigh link 22 and the handle 9 are connected to each other near the knee joint. According to the above-described configuration, it is possible to prevent the load applied to the handle 9 from counteracting the moment which assists the user's standing-up motion.

Further, the leg brace 2 also includes two rear thigh links 22 arranged so as to sandwich a thigh 3 of the user therebetween in the left/right direction of the user. The handle 9 is provided in order to connect the two rear thigh links 22 to each other. According to the above-described configuration, the two rear thigh links 22 can be connected to each other by the handle 9. Therefore, the handle 9 contributes to improving the rigidity of the leg brace 2.

The above-described first embodiment can be modified as described below.

That is, in the rear connection part 24*b*, which connects the rear thigh link 22 and the lower-leg ling 23, a bending/stretching assisting motor that controls the angle between the rear thigh link 22 and the lower-leg facing part 23 is provided, so that the bending/stretching motion of the knee joint may be assisted.

Further, although the link structure 7 is the four-bar link in the above-described embodiment, it is not limited to such an example. For example, the front thigh link 21 and the gas spring 29 are not indispensable. Further, the rear thigh connection part 27 and the switching snap 28 are also not indispensable.

Second Embodiment

Next, a second embodiment will be described with reference to FIG. 3. This embodiment will be described hereinafter with a particular emphasis on differences from the first embodiment, and redundant descriptions will be omitted.

In the first embodiment, each of the front projecting parts 9*a* of the handle 9 is attached to the rear thigh link upper part 22A of a respective one of the rear thigh links 22 in an undetachable manner as shown in FIG. 1.

Figure 3:
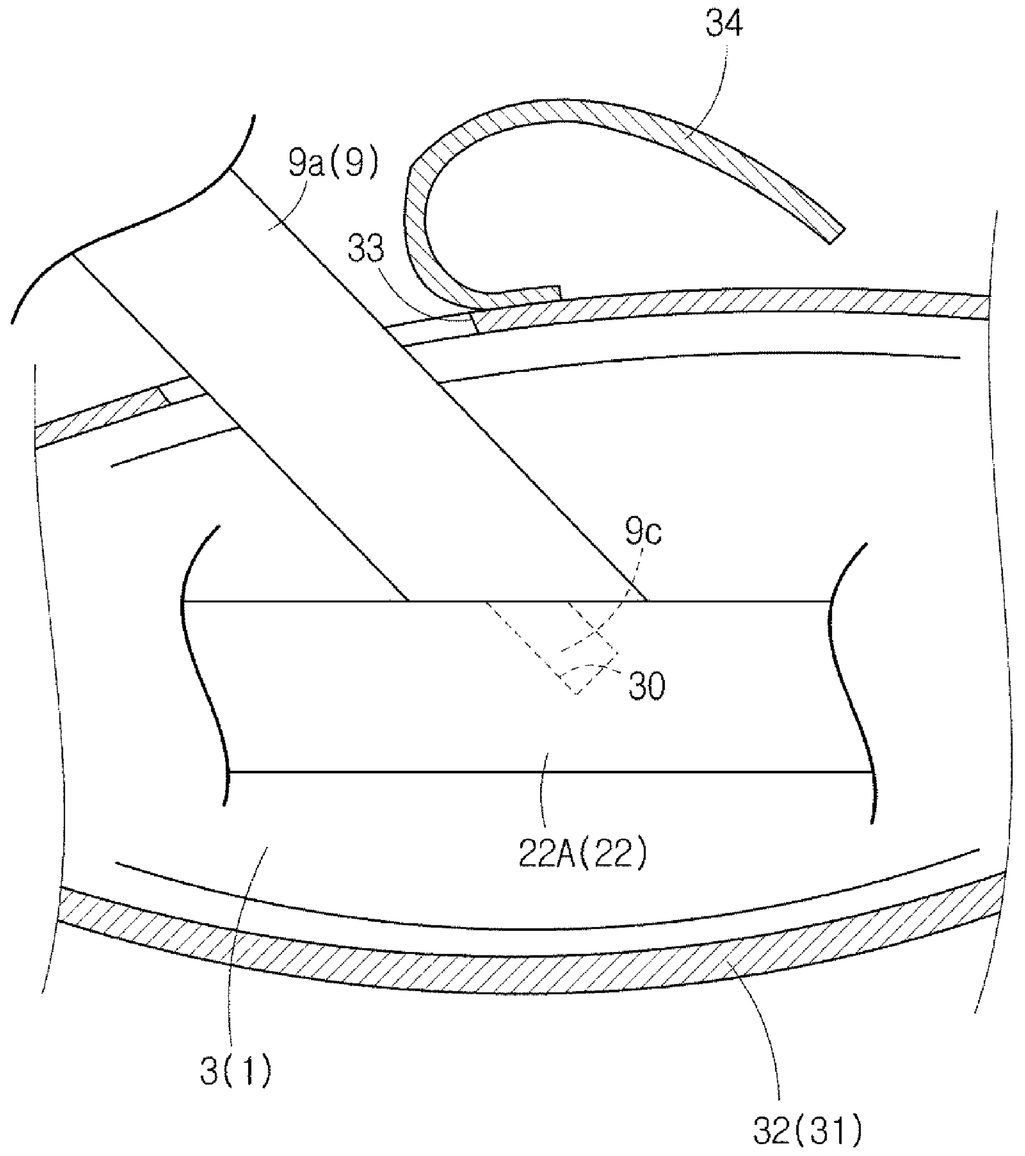
FIG. 3 is a side view showing a connecting structure between a handle and a thigh link (second embodiment)

In contrast, in this embodiment, each of the front projecting parts 9*a* of the handle 9 is detachably attached to the rear thigh link upper part 22A of a respective one of the rear thigh links 22 as shown in FIG. 3. According to the above-described configuration, when the handle 9 is not used, the handle 9 can be detached from the rear thigh links 22. Therefore, when the handle 9 is not used, the leg brace 2 can be made compact in size.

Note that the means for making each of the front projecting parts 9*a* attachable to and detachable from a respective one of the rear thigh link upper parts 22A is not limited to any particular means. For example, they may be connected by screws or may be magnetically connected. In this embodiment, the handle 9 may further include an attachment projecting part 9*c* that projects from each of the front projecting parts 9*a* toward the rear thigh link upper part 22A. Further, the handle 9 is configured so that it can be attached to and detached from the rear thigh link upper parts 22A by inserting each of the attachment projecting parts 9*c* of the handle 9 into an attachment recessed parted part 30 formed in a respective one of the rear thigh link upper parts 22A. That is, the attaching recessed parts 30 are formed in the rear thigh link upper parts 22A as attaching/detaching parts for attaching/detaching the handle 9 to/from the rear thigh link upper parts 22A. According to the above-described configuration, the handle 9 can be attached to and detached from the rear thigh link upper parts 22A.

Further, FIG. 3 shows trousers 31 as an example of a garment which is put on the legs of a user to which (i.e., to at least one of which) the leg brace 2 is attached. The trousers 31 are put on the legs so as to cover the leg brace 2. The trousers 31 are a garment that the user puts on by inserting each of his/her legs into a respective one of two branched cylindrical part 32 thereof. In this embodiment, an opening 33 having a shape that conforms to the shape of the attachment recessed part 30 is formed in the cylindrical part 32. The opening 33 conforms to the attachment recessed part 30. The opening 33 is formed on the front side of the trousers 31. The opening 33 has a sufficiently large size so that the user can easily pass the front projecting part 9*a* therethrough. With the above configuration, the user can attach/detach the handle 9 to/from the rear thigh link upper parts 22A in the state where the user is wearing the trousers 31.

Further, the cylindrical part 32 of the trousers 31 is provided with an opening cover 34 that covers the opening 33. The opening cover 34 may be sewn to the cylindrical part 32 so that it provides a state in which the opening 33 is covered by the opening cover 34 and a state in which the opening 33 is exposed in a switchable manner. According to the above-described configuration, since the opening 33 can be covered by the opening cover 34 when the handle 9 is not used, the design of the trousers 31 is improved.

Third Embodiment

Next, a third embodiment will be described with reference to FIG. 4. This embodiment will be described hereinafter with a particular emphasis on differences from the first embodiment, and redundant descriptions will be omitted.

In the first embodiment, the handle 9 is a double fixed beam supported by the two rear thigh links 22 as shown in FIG. 1.

Figure 4:
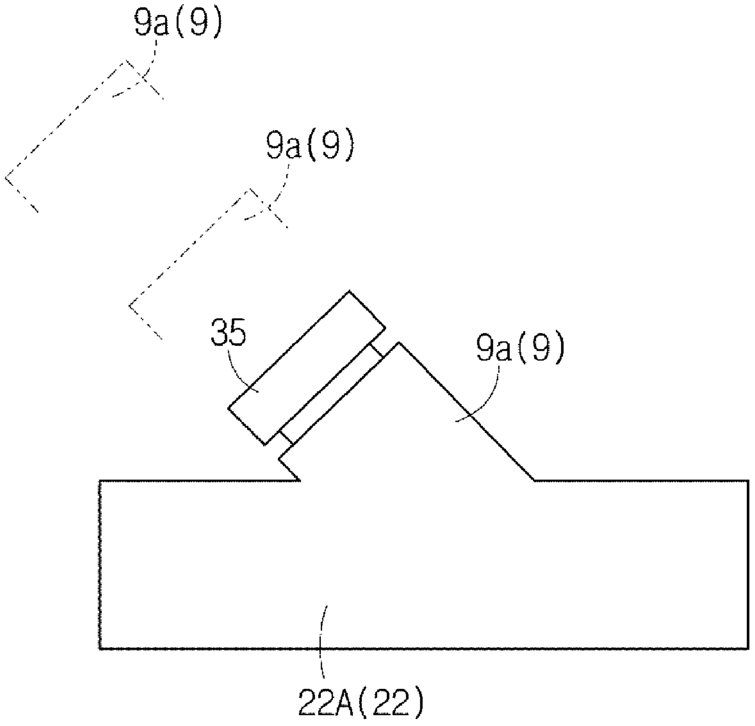
FIG. 4 shows a handle that can extend and contract in a longitudinal direction (third embodiment)

In contrast, in this embodiment, the handle 9 is not provided with the grasping part 9*b* as shown in FIG. 4. The handle 9 includes a cantilevered front projecting part(s) 9*a* supported by the rear thigh link upper part(s) 22A. Further, the front projecting part 9*a* is configured so as to be able to extend and contract in its longitudinal direction thereof. According to the above-described configuration, when the handle 9 is not used, the handle 9 can be contracted in the longitudinal direction. Note that in this case, the user grasps an upper end 35 of the front projecting part 9*a* when he/she stands up from the sitting position.

Fourth Embodiment

Next, a fourth embodiment will be described with reference to FIG. 5. This embodiment will be described hereinafter with a particular emphasis on differences from the first embodiment, and redundant descriptions will be omitted.

In the first embodiment, each of the front projecting parts 9*a* of the handle 9 is attached to the rear thigh link upper part 22A of a respective one of the rear thigh links 22 in a non-rotatable manner as shown in FIG. 1.

Figure 5:
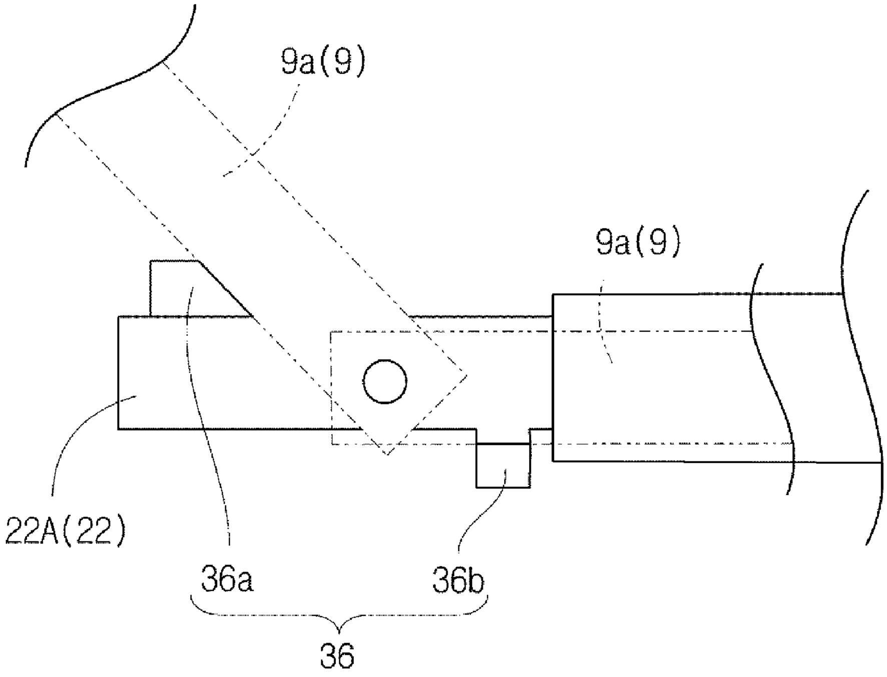
FIG. 5 shows a handle that can be tilted (fourth Embodiment).

In contrast, in this embodiment, the front projecting part 9*a* of the handle 9 is rotatably attached to the rear thigh link upper part 22A of a respective one of the rear thigh links 22 as shown in FIG. 5. Further, the rear thigh link upper part 22A is provided with an angle regulating mechanism 36 that regulates a range of the angle between the front projecting part 9*a* and the rear thigh link upper part 22A. The angle regulating mechanism 36 includes a first stopper 36*a* and a second stopper 36*b*.

The first stopper 36*a* prevents the forward projecting part 9*a* from further rotating counterclockwise from a first posture in which the forward projecting part 9*a* projects forward and upward in an oblique direction when the user is in the sitting position, and maintains the first posture of the forward projecting part 9*a*. A typical example of the posture-maintaining means is magnetic coupling, but it is not limited to such an example.

The second stopper 36*b* prevents the front projecting part 9*a* from further rotating clockwise from a second posture in which the front projecting part 9*a* extends along the rear thigh link upper part 22A when the user is in the sitting position, and maintains the second posture of the front projecting part 9*a*. A typical example of the posture-maintaining means is magnetic coupling, but it is not limited to such an example.

That is, the handle 9 is configured so as to be switchable between the first posture of the front projecting part 9*a* and the second posture thereof. According to the above-described configuration, when the handle 9 is not used, the handle 9 can be brought into the second posture. Therefore, when the handle 9 is not used, the leg brace 2 can be made compact in size. An example of the state where the handle 9 is not used is, for example, a state where user is walking.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A leg brace configured to be attached to a leg of a user, comprising:

a thigh link configured to extend along a thigh of the user;

a lower-leg link rotatably connected to the thigh link and extending along a lower leg of the user;

a buttock support part configured to support a buttock of the user, the buttock support part configured to face a hipbone of the user when the user is sitting, an upper end of the thigh link being rotatably connected to the buttock support part; and a handle directly projecting from the thigh link, directly fixed to the thigh link such that the handle does not move relative to the thigh link, and extending in an anterior and oblique direction when the user is in the sitting position, the handle being configured to generate a moment to lift the buttock support part upward in the thigh link when the user stands from the sitting position and the user grasps the handle to apply a load to the handle.

2. The leg brace according to claim 1, wherein the thigh link and the lower-leg link are connected to each other near a knee joint of the user, and the thigh link and the handle are also connected to each other near the knee joint.

3. The leg brace according to claim 1, wherein the handle is disposed in the thigh link in a cantilevered manner.

4. The leg brace according to claim 1, further comprising two thigh links arranged so as to sandwich a thigh of the user therebetween in a left/right direction of the user, wherein the handle is disposed so as to connect the two thigh links to each other.

5. The leg brace according to claim 1, wherein the handle is detachably disposed in the thigh link.

6. The leg brace according to claim 5, wherein an attaching/detaching part is formed in the thigh link, the attaching/detaching part being configured to attach/detach the handle to/from the thigh link.

7. The leg brace according to claim 1, wherein the handle can extend and contract in a longitudinal direction.

8. The leg brace according to claim 1, wherein the handle is configured to be switchable between a first posture in which the handle projects forward when the user is in the sitting position and a second posture in which the handle extends along the thigh link when the user is in the sitting position.

9. A garment with an opening formed therein, the garment being configured to be put on a leg of a user, to which the leg brace according to claim 6 is attached, so as to cover the leg brace, the opening conforming to the attaching/detaching part.

10. The garment according to claim 9, comprising an opening cover configured to cover the opening.

11. The leg brace according to claim 1, wherein the handle being non-rotatably fixed to the thigh link is configured to move relative to the lower-leg link via a rear connection part.

* * * * *